United States Patent [19]
Steiner et al.

[11] Patent Number: 5,573,488
[45] Date of Patent: Nov. 12, 1996

[54] METHOD AND DEVICE FOR EXCHANGING TOOLS FOR A PRESS

[75] Inventors: Jean P. Steiner, Crissier; Charly Varidel, Le Mont, both of Switzerland

[73] Assignee: Bobst SA, Lausanne, Switzerland

[21] Appl. No.: 309,980

[22] Filed: Sep. 20, 1994

[30] Foreign Application Priority Data

Sep. 22, 1993 [CH] Switzerland .......................... 02857/93

[51] Int. Cl.⁶ .................................................. B23Q 3/155
[52] U.S. Cl. .................................. 483/1; 100/918; 483/28
[58] Field of Search ................................... 483/1, 28, 29; 83/563, 564, 481; 100/918, 299; 72/446

[56] References Cited

U.S. PATENT DOCUMENTS

| | | | |
|---|---|---|---|
| 4,706,532 | 11/1987 | Hashimoto | 83/563 |
| 4,741,092 | 5/1988 | Labarre | 483/28 |
| 5,215,512 | 6/1993 | De Dompierre | 483/28 |

FOREIGN PATENT DOCUMENTS

| | | |
|---|---|---|
| 2595980 | 3/1986 | France . |
| 1118125 | 6/1968 | United Kingdom . |
| WO86/01444 | 3/1986 | WIPO . |

*Primary Examiner*—William R. Briggs
*Attorney, Agent, or Firm*—Hill, Steadman & Simpson

[57] ABSTRACT

A device for exchanging cutting tools including a movable carriage having a base arranged beneath a floor of a platform surrounding the cutting section of the platen press with the base having a portion extending through a slot in the platform provided with a supporting axle, a supporting frame made of a basic plate and two vertical standards connected at the upper end to form an isosceles triangle is provided with a sliding bearing that is telescopically received on the supporting axle and the carriage includes an arrangement for shifting the supporting frame vertically relative to the base so as to enable lifting a cutting tool from the support arm of the press. The basic member of the supporting frame has spaces on each side of the frame for supporting two cutting tools so that two new tools can be placed on one side of the frame and two tools to be replaced can be carried on the other side of the frame during exchange of one pair of cutting tools for another.

11 Claims, 4 Drawing Sheets

METHOD AND DEVICE FOR EXCHANGING TOOLS FOR A PRESS

BACKGROUND OF THE INVENTION present invention is directed to a method for exchanging cutting tools in a platen press and to a device for accomplishing this method, especially for the exchange of the upper and the lower tools of the cutting section of the platen press.

The cutting section of a platen press usually comprises a pair of arms which extend perpendicularly to the side of the frame of the press on the operator's side. In a way of execution, these arms may pivot around an axle located close to the external face of the side frame so as to be bent back toward the frame when they are not in use. This solution increases the space available in front of the machine and allows the operator to move easily close to the machine.

In another way of execution, for instance with machines processing sheets of smaller sizes, these arms may be firmly fixed and, thus, extend permanently perpendicularly to the frame's side face.

On the inner face, each arm includes two grooves in which the cutting tools are slid when extracted from the cutting section. Moreover, each arm includes a pivoting device which is located at the end opposite the connection of the arms with the frame. This pivoting device is destined to allow the cutting tool to be pivoted up to 180° around a horizontal axis.

A new job, which has to be achieved with the platen press, requires the exchange of the previously-used tools with subsequently-used tools proper to this new job.

In the devices known up to now, the exchange or removal of the cutting tools is usually executed with the help of an auxiliary carriage which comprises two lengthwise beams oppositely arranged between two lateral frames. On the inner faces of these beams, these lengthwise beams will have two grooves of which a pair is to carry a subsequently-used tool. For job changes, the carriage is brought in front of the space existing between the arms of the cutting section and, once one of the tools previously used in the platen press has been slid onto the arms, then the tool is inserted in the pair of grooves left free on the carriage and is locked in a horizontal position in these grooves and the assembly, which consists of the subsequently-used tool, and the previously-used tool and the lengthwise beams is then pivoted up to 180° around a horizontal axis so as to have the subsequently-used tool positioned exactly in front of the grooves of the arms. Then, the new tool is unlocked and inserted in the cutting section where it will be locked again in the press. The carriage can then be moved away from the front of the machine and the previously-used tool be unloaded in order to have the second subsequently-used tool loaded and the operation started again.

Among other drawbacks, this way of changing tools has the disadvantage of implying twice the loading and once the unloading of the tools on the carriage, which operations are time-consuming and have a negative influence on the production of the platen press which is to be at a standstill during the whole process. Moreover, should the tools be poorly locked on the carriage, it could happen that one of them, which may reach a weight of 50 kilograms, may fall off during the rotation around the horizontal axis with the risk of hurting the operator. It should also be mentioned that this solution is cumbersome and requires an important space in front of the platen press, which fact is not compatible with an optimal use of the space available close to the machine.

SUMMARY OF THE INVENTION

The object of the present invention is to increase the production of the platen press as well as improve the security and use of the installation. It is, therefore, necessary to reduce as much as possible the downtime caused by the setting-up of new jobs and job changes, as well as reduce the cumbersomeness of the device required for the exchange of various cutting tools of the platen press.

Another object and goal of the present invention is to withdraw and overcome the above-mentioned drawbacks. To accomplish this aim, the invention is directed to an improved method for exchanging cutting tools in a platen press by means of a movable carriage, the method comprising the steps of putting the first and second replacement parts of the cutting tool on a first face of a supporting frame of a movable carriage when the carriage is in an off-position, then removing the first and second tools to be replaced from the platen press by moving each tool separately onto the arms, rotating it around 90°, engaging it with the second face of the carriage to lift it from the arms, then, after removing both tools, rotating the carriage 180° around a vertical axis to present the new tools to be inserted, separately transferring each of the new tools onto the arms, rotating the new tool through 90° into a horizontal plane and inserting it into the cutting section, then moving the second new tool into position on the arms, pivoting it through 90° and moving it into the cutting section and locking the tools therein, each of the steps of loading and unloading including raising a portion of the tool carriage to lift the tools from said arms and lowering the portion to lower the tools onto said arms.

The device includes that the movable carriage, which has a base which extends beneath a floor of a platform of the press and which base has first means for guiding and for rolling on a track in a direction perpendicular to a side face of the frame of the cutting section, a portion of the base extends through a slot in the platform and supports an upper supporting frame which has a sliding bearing telescopically received on a supporting axle of the base. The supporting frame preferably is constructed with a triangular configuration having a base plate with two upstanding members being joined at an upper point, the frame is pivoted at the upper point to means for raising and lowering the frame relative to the base, and the frame has seats on each side for supporting the vertically orientated cutting tools as they are placed on this frame.

Other advantages and features of the invention will be readily apparent from the following description of the preferred embodiments, the drawings and claims.

DESCRIPTION OF THE PREFERRED EMBODIMENTS

Figure 1:
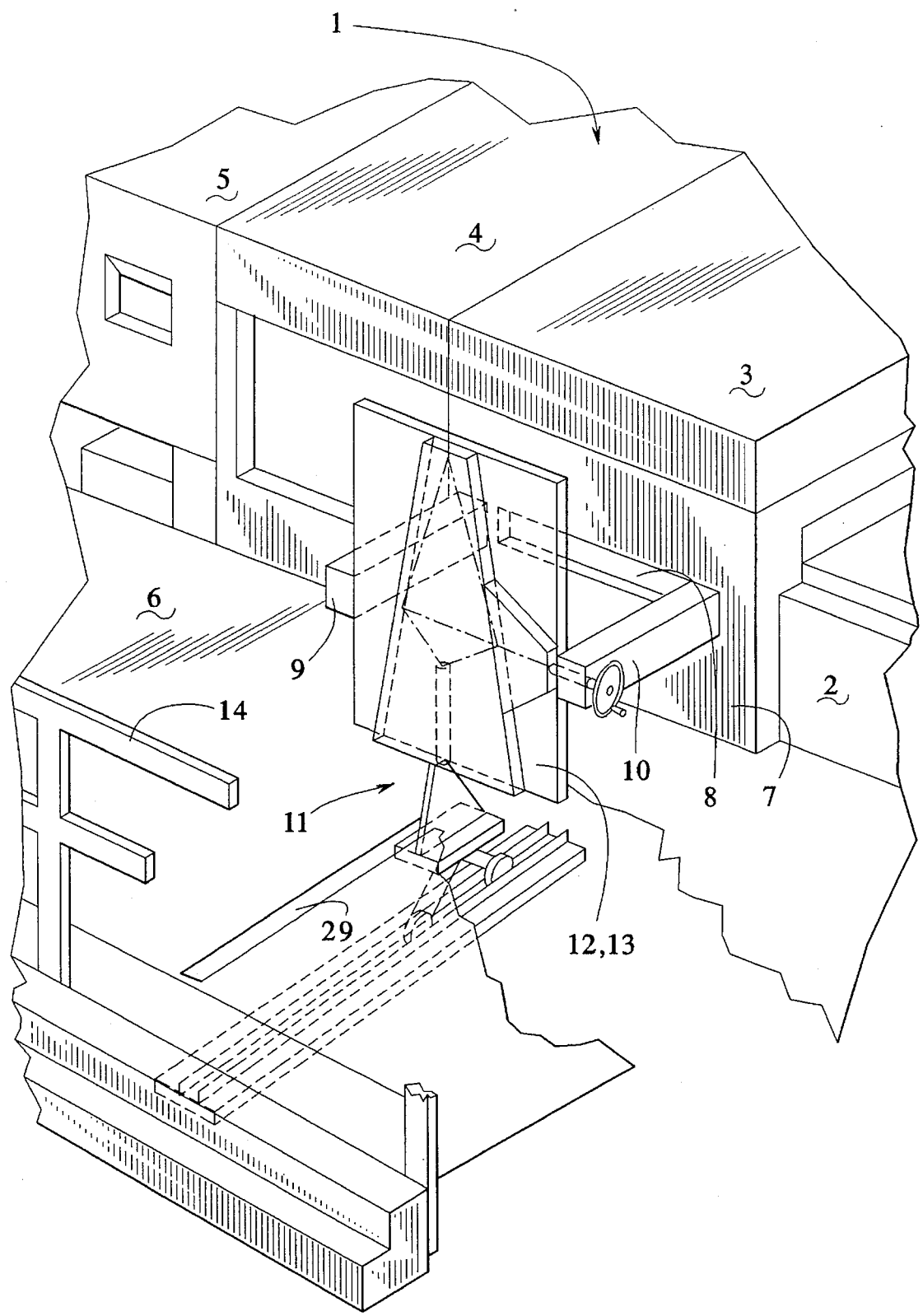
FIG. 1 is a partial perspective view with portions broken away of a cutting press having the improvement of the present invention.

The principles of the present invention are particularly useful when incorporated in a cutting press, generally indicated at 1 in FIG. 1. The cutting press usually consists of an infeed station 2, a cutting station 3, a waste-stripping station 4 and a delivery station 5. In order to provide for rational working conditions around the cutting press, a platform 6 completes the machine.

On a side frame 7, the cutting section 3 is provided with an aperture 8 which is open to a passage for the cutting tools 12 and 13 to be inserted into the cutting section 3 or extracted from the cutting section 3. Two arms 9 and 10 are arranged on either side of this aperture 8. These arms are provided to support the cutting tools 12 and 13 when the tools are being inserted into or extracted from the cutting section. In this way of execution, as illustrated in FIG. 1, these arms 9 and 10 are firmly fixed on the side frame 7 of the cutting station 3. With another execution of the machine, these arms 9 and 10 can be fitted so as to pivot around an axis located close to the side frame 7. On either inner face, these arms are provided with two superimposed grooves which fit the lateral edges of the cutting tools 12 and 13. The ends of the arms 9 and 10, which is the end away from the side frame 7, also have an arrangement for pivoting the cutting tools 12 and 13 from a horizontal plane into a vertical plane.

The cutting press of this type illustrated in FIG. 1 is to achieve a number of various jobs and this fact requires a frequent exchange of the cutting tools. The tools 12 and 13 of more or less rectangular shape are difficult to manipulate on account of their size, which may take up a surface of more than one square meter and even with certain machine sizes, the cutting tools reach a size of two square meters.

In order to exchange tools, a carriage, generally indicated at 11, is produced and may be moved to an off-position or retracted position close to a barrier or railing 14 at the edge of the platform 6 removed or spaced from the section 3. This carriage 11 will move from the off-position to the position illustrated in FIG. 1 adjacent to the ends of the arms 9 and 10 to allow exchanging of the cutting tools, such as 12 and 13.

Figure 2:
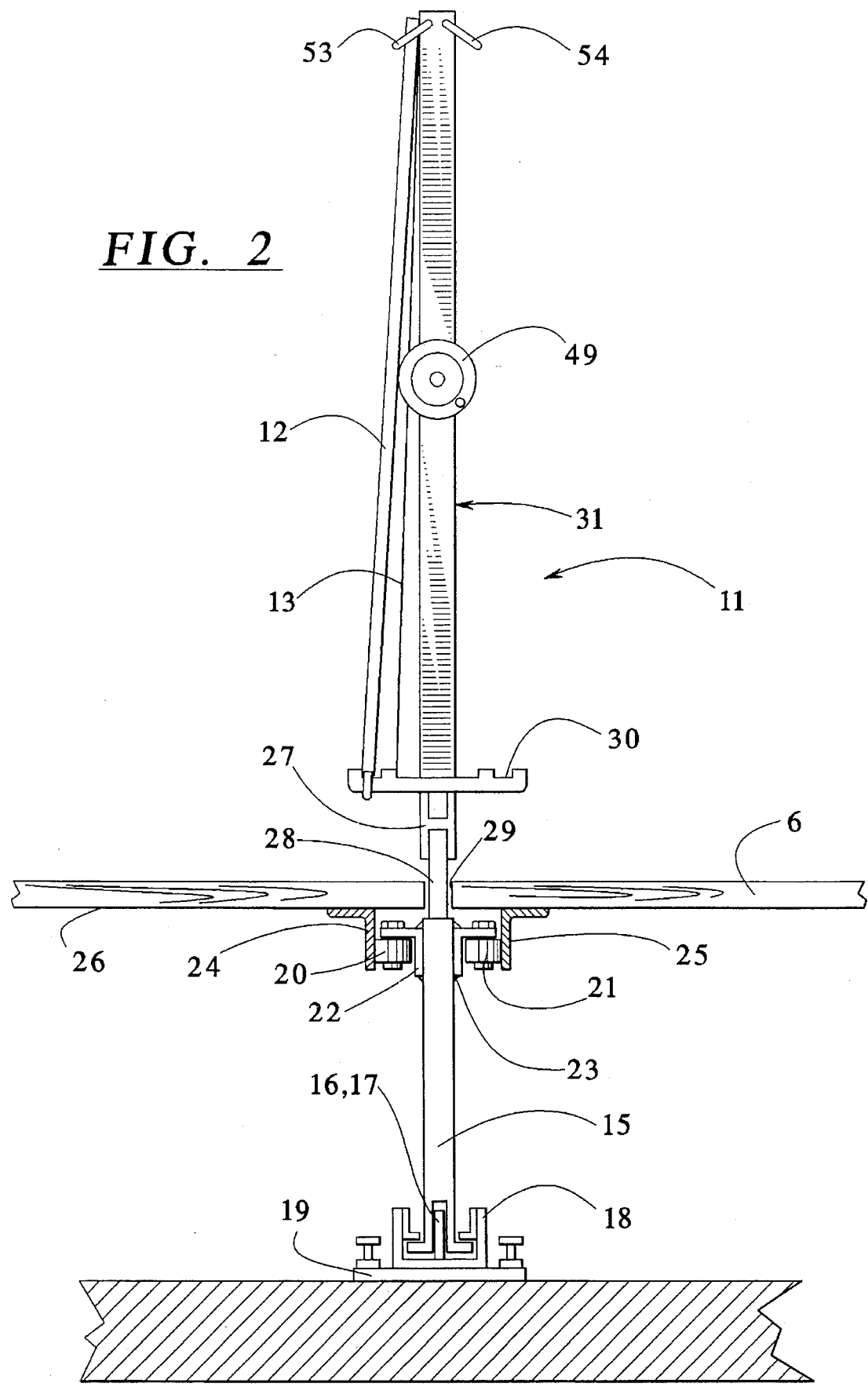
FIG. 2 is an end view of the tool exchanging device of the present invention.
Figure 3:
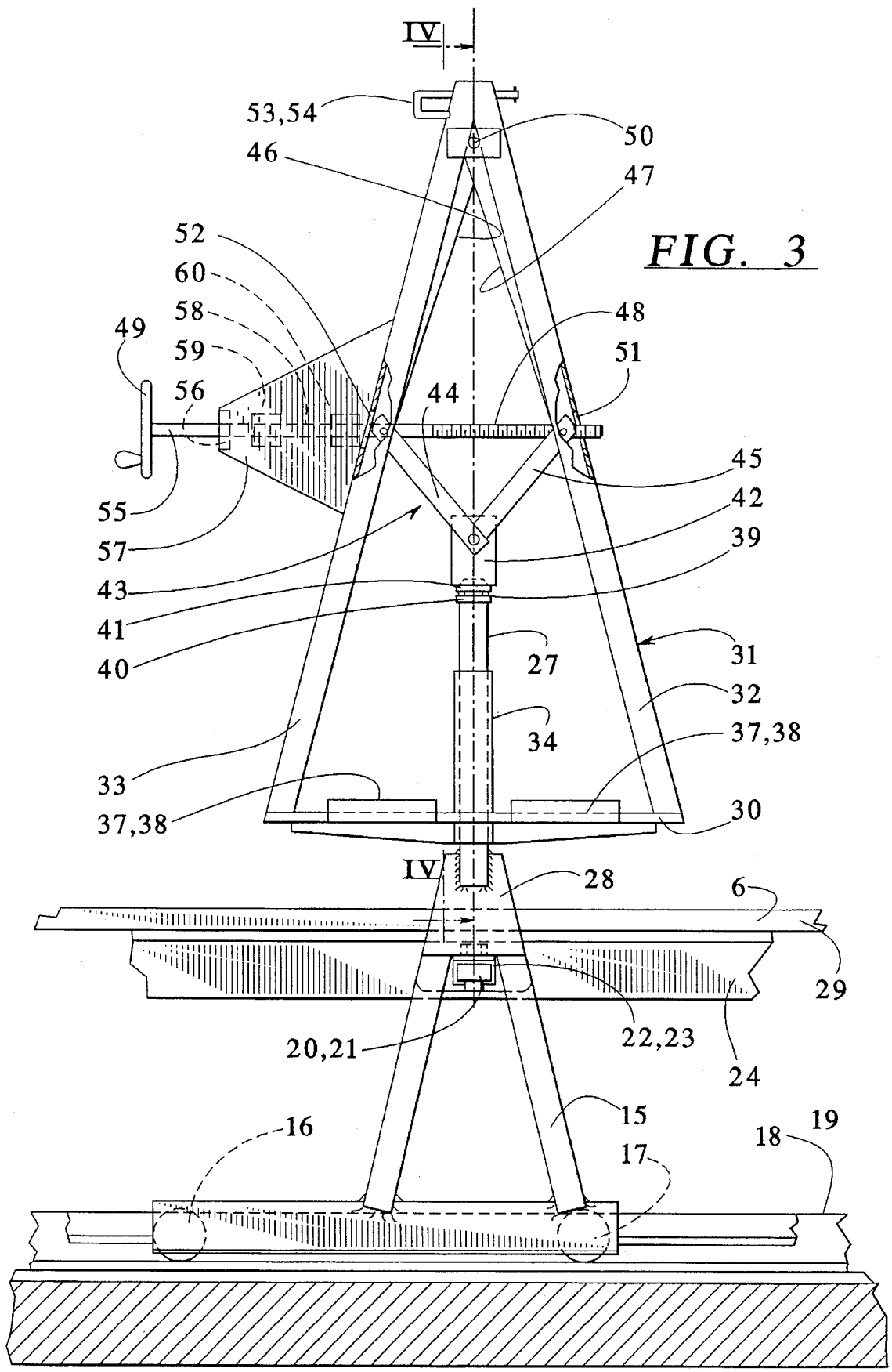
FIG. 3 is a side elevational view of the device shown in FIG. 2.

As best illustrated in FIGS. 2 and 3, the carriage includes a base 15, which is provided on its lower side with rollers 16 and 17, which roll along a rail 18, which is arranged on the ground owing to a shoe or support plate 19. As illustrated, the rail 18 and the base 15 are provided with interlocking flanges to prevent the rollers from leaving the rail 18. The upper part of the base 15 is provided with two rollers 20 and 21, whose axles are mounted on corner-pieces or L-shaped members 22 and 23, which are fastened such as by welds on each side face of the base 15. The rollers 20 and 21 slide on a guiding groove which is formed by two iron corner braces or angle iron members 24 and 25 which are mounted on the lower face 26 of the platform 6 adjacent a slot 29 therein. An upper end of the base 15 includes a supporting axle 27 which is connected to the base by means of a linking member or piece 28, which extends through the slot 29 which is in the platform 6. As illustrated in FIG. 1, the slot 29 extends across substantially the width of the platform 6 perpendicular to the side or face of the frame of the cutting section 3 and is preferably arranged in the medium axis of the space existing between the two arms 9 and 10.

The supporting axle 27, as best illustrated in FIG. 3, extends through a basic plate 30 of a supporting frame 31, which comprises also two vertical standards 32 and 33 arranged almost vertically on the basic piece 30 so as to make up an isosceles triangle. Moreover, the basic plate or piece is equipped with a sliding bearing 34 which is telescopically received on the supporting axle 27 and the sliding bearing 34 moves vertically along the supporting axle during the ascent and descent of the supporting frame. The basic plate 30 also has seats 35 and 36 (see FIG. 4) provided with protuberances 37 and 38 to limit the size of the seats which will be symmetrically arranged on either side of the supporting axle 27 in the upper part of the basic plate 30.

Figure 4:
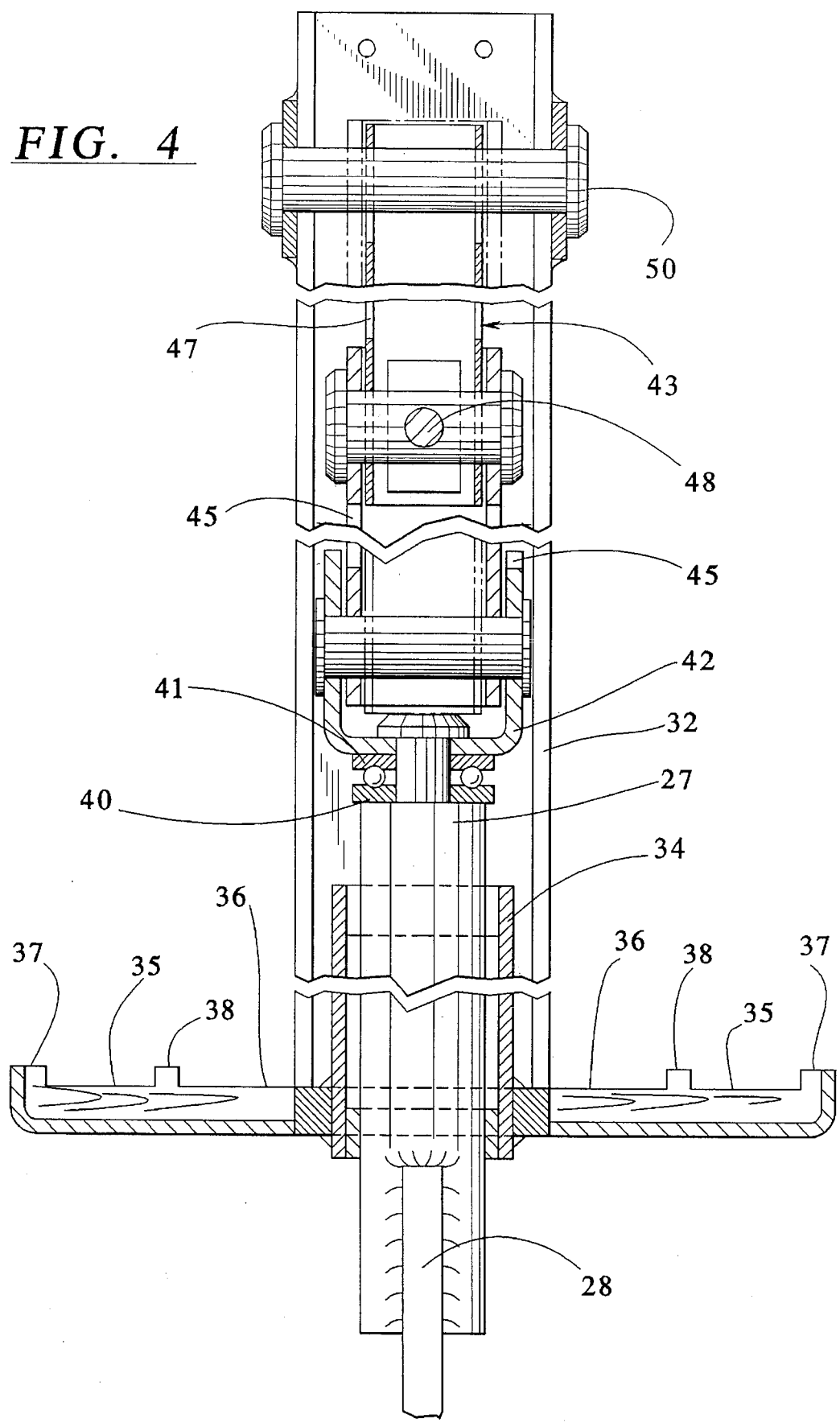
FIG. 4 is a partial cross sectional view taken along the line IV—IV of FIG. 3.

As best shown in FIGS. 3 and 4, the upper portion of the supporting axle 27 is provided with a thrust bearing 39, whose lower ring 40 is permanently secured on the supporting axle 27 and whose upper ring 41 is linked with a lower pivot point 42 of a hoisting means 43 which, when actuated, raises and lowers the supporting frame 31 relative to the base 15. As illustrated in FIG. 3, the hoisting means consists of folded arms having four rods 44, 45, 46 and 47 which are linked together to make up an asymmetric rhombus that may change shape under the action of a cross screw 48 equipped with a crank 49. An upper pivot point 50 for the hoisting means 43 is linked with the supporting frame 31 at a junction point of the two vertical standards 32 and 33, i.e., close to the top of the isosceles triangle made up of the basic plate 30 and the two above-mentioned vertical standards 32 and 33. Lengthwise splits 51 and 52 are provided on each of the vertical standards 32 and 33 so as to enable the vertical relative movement up and down of the supporting frame when the hoisting means 43 is set into operation. The axis of the cross screw 48 is linked with the crank 49 through a first axle 55, which is supported by a bearing 56 arranged in a supporting arm 57 which is welded to the vertical standard 33. A second axle 58 is provided with two rotary articulating joints 59 and 56 at its ends which link the first axis 55 with the axle of the cross screw 48 and allows for vertical movement of the supporting frame 31 relative to the cross screw 48. In addition, the supporting frame 31 is provided on its upper part with means for retaining the cutting tools 12 and 13, which consist of pivoting hooks 53 and 54 which may be locked in two separate positions.

FIG. 4 illustrates the linkage between the supporting axle 27 and the hoisting means 43. As may be seen, the whole assembly made up of the hoisting means 43 and the supporting axle 27 is included in the thickness of the vertical standards 32 and 33, which are made out of U-shaped or channel-shaped members. It should also be noted that the hoisting means 43 can be constructed of another arrangement besides the screw and lever arms illustrated. For example, it can consist of a pneumatic jack or the screw can be replaced by a mechanical, hydraulic or pneumatic jack for causing the raising and lowering.

As mentioned above, it is necessary to exchange the cutting tools 12 and 13 when a different job is to be achieved with the platen press 1, or else when old or damaged tools have to be removed. In order to have the cutting tools 12 and 13 exchange, the operator puts the parts of the first replacement cutting tool 13 and the second replacement cutting tool 12 on a first face of the supporting frame 31 of the movable carriage when the carriage is in the off-position, which is adjacent the railing 14. Then, the part of the first cutting tool which is to be replaced is moved onto the arms 9 and 10, which are arranged at the level of the cutting section 3. This tool to be replaced is rotated about a horizontal axis to bring it into a vertical plane. Then the carriage 11 is moved in the slot 29 close to the arms 9 and 10 of the section. This tool part is then placed on the carriage against the second face of the supporting frame 13 by raising the frame to lift the tool from the arms 9 and 10. Then, the second tool to be replaced can be moved out on the arms and removed or, if desired, before removing the second tool, the carriage is shifted away from the arms and rotated through 180° to present the first new tool which is then loaded onto the arms, rotated into the horizontal plane and then is inserted and locked in the cutting section of the platen press. Then, in order to exchange the second cutting tool 12 which has to be replaced in the cutting section of the platen press, the operator extracts this second tool from the machine in order to bring it onto the arms 9 and 10, pivots it through an angle of 90° around a horizontal axis into a vertical orientation, shifts the carriage into a position to engage the tool to be replaced on the second face of the frame, raises the supporting frame to lift the tool from its pivots so that it is completely supported by the supporting frame, shifts the carriage away from the arms 9 and 10 and the supporting frame 13 is then rotated 180° around a vertical axis so that the first face carrying the second replacement tool will be facing the arms of the cutting section. This second tool is then brought close to the pivots of the arms 9 and 10 and then lowered onto the pivots in order to have it released from the supporting frame 31 of the carriage 11 before the carriage is set back to its off-position. The tool 12 will then be pivoted again through an angle of 90° around a horizontal axis so that it will be in a horizontal plane for insertion into the cutting section where it will be locked.

Although various minor modifications may be suggested by those versed in the art, it should be understood that we wish to embody within the scope of the patent granted hereon all such modifications as reasonably and properly come within the scope of our contribution to the art.

We claim:

1. A method of exchanging cutting tools in a platen press by means of a movable carriage, said method including loading a replacement tool in a vertical orientation on a support frame of a movable carriage which is in a retracted position; removing the tool to be extracted from the platen press by moving the tool onto arms extending from the press, rotating the tool to be extracted into a vertical orientation around a horizontal axis, moving the carriage close to the arms, and transferring the tool to be replaced onto the carriage by raising the carriage to lift the tool from the ends of the arm; withdrawing the carriage, rotating the carriage 180° around the vertical axis to present the new tool; and then inserting the new tool into the press by placing the new tool on the ends of the arms by lowering the new tool onto the arms, then pivoting the new tool 90° around a horizontal axis into the horizontal plane, and moving the new tool into the press when the tool is locked in position in the press.

2. A method according to claim 1, wherein the step of loading the new tool loads a first and second tool part on one side of said frame, the step of removing the old tool removes the first of the old tools and then removes the second of the old tools and the step of inserting the new tool loads the first of the new tools, then loads the second of the new tools.

3. A method according to claim 1, wherein the step of loading the new tools onto the carriage loads a first and second tool on the carriage, and after the step of removing the tool from the press and inserting the new tool, includes unloading the second of the tools to be replaced onto the carriage by engaging the second tool on the carriage, then rotating the carriage 180° around the vertical axis to present the second of the new tools, and lowering the second new tool onto the arms of the press to be inserted into the press.

4. A device for exchanging tools for a platen press, said device including a movable carriage having a base arranged beneath a floor of a platform of the press, said base being provided with first means for rolling and guiding so as to enable the base to move perpendicularly to a side frame of the cutting section of the press in a slot arranged in the floor of the platform, said base having a portion extending through said slot equipped with a supporting axle, a supporting frame made of a basic plate provided with a sliding bearing telescopically received on the supporting axle, said frame having upstanding vertical members interconnected to the basic plate and being connected above the basic plate, hoisting means being positioned between an upper portion of the supporting frame and the supporting axle for shifting the frame relative to the axle to cause a vertical ascent and descent of the supporting frame, said basic plate being provided with seats for supporting cutting tools and the frame adjacent the upper portion being provided with means for retaining the cutting tools on the supporting frame.

5. A device according to claim 4, wherein the first means includes rollers fitted on the base of the carriage and rolling on a rail arranged on the ground beneath the platform, and including rollers arranged on either side of the upper part of the base and rolling in a track consisting of angle iron braces fixed on a lower face of the platform adjacent each side of the slot.

6. A device according to claim 4, wherein the hoisting means consists of folded arms actuated with a cross screw.

7. A device according to claim 4, wherein the hoisting means includes four links interconnected to form a rhombus, one corner of the rhombus being connected to an end of the supporting axle, an opposite corner of the rhombus being connected to an upper portion of the support frame, and means interconnecting the remaining two corners for moving the corners together and away from each other to cause a lifting of the supporting frame relative to the supporting axle.

8. A device according to claim 4, wherein a connection between the hoisting means and the supporting axle includes a thrust bearing having two rings with bearing members disposed therebetween, one of said rings being secured onto the supporting axle and the other of the two rings being secured to the hoisting means.

9. A device according to claim 4, wherein the upstanding members are interconnected at the top and form with the basic plate an isosceles triangle, said means for retaining the cutting tools consisting of pivoting hooks fitted on an upper part of the isosceles triangle, each of the pivoting hooks having two locking positions.

10. A device according to claim 4, wherein the upstanding members of the supporting frame are interconnected together at the upper end and form with the basic plate an isosceles triangle having a base formed by the basic plate.

11. A device according to claim 10, wherein the hoisting means comprising a jack having a body mounted for rotation on the supporting axle and a rod connected to an upper part of the isosceles triangle.

\* \* \* \* \*